United States Patent [19]

Guerin

[11] Patent Number: 5,241,329
[45] Date of Patent: Aug. 31, 1993

[54] MULTIPLE RESOLUTION ROS

[75] Inventor: Jean-Michel Guerin, Glendale, Calif.

[73] Assignee: Xerox Corporation, Stamford, Conn.

[21] Appl. No.: 627,671

[22] Filed: Dec. 14, 1990

[51] Int. Cl.$^5$ .............................................. H04N 1/21
[52] U.S. Cl. ...................................... 346/108; 358/298
[58] Field of Search ................. 346/108, 107 C, 76 L, 346/160, 1.1; 358/298

[56] References Cited

U.S. PATENT DOCUMENTS

| | | | |
|---|---|---|---|
| 4,686,542 | 8/1987 | Yip et al. | 346/108 |
| 4,733,252 | 3/1988 | Daniele et al. | 346/108 |
| 4,780,732 | 10/1988 | Abramov | 346/160 |
| 4,803,497 | 2/1989 | Kennedy, Jr. et al. | 346/108 |
| 4,806,951 | 2/1989 | Arimoto et al. | 346/108 |
| 4,847,643 | 7/1989 | Ohmori | 346/160 |
| 4,905,027 | 2/1990 | Itoh | 346/160 |
| 4,907,017 | 3/1990 | Azuma | 246/108 |
| 4,926,200 | 5/1990 | Ohyama et al. | 346/160 |

*Primary Examiner*—Mark J. Reinhart
*Attorney, Agent, or Firm*—Robert E. Cunha

[57] ABSTRACT

A raster output scanner which can be instantly varied between the most common spot densities, such as 240, 300, 400 and 600 spots per inch in the slow scan direction. The scanner produces a plurality of scans per inch, either by scanning with one beam or several simultaneous beams, the number of scans per inch being a common denominator of all of the spot densities. For example, for the above spot densities, 1200 scans per inch would be required. Then each scan is independently modulated so that the correct number of spots per inch are generated. Thus, for example, if 4 consecutive scans are used to create one spot, then the spot density will be 300 spots per inch.

2 Claims, 2 Drawing Sheets

MULTIPLE RESOLUTION ROS

BACKGROUND OF THE INVENTION

A raster output scanner (ROS) that can switch between outputs of 240, 300, 400 and 600 spots per inch (spi) by using a 1200 lines per inch addressability printer and switching the data for each scan on or off at the correct time to create the required density of spots per inch.

Electronic printers are currently single resolution printers, i.e. either 240, 300, 400, etc., spi. The resolution is chosen on the basis of desired copy quality and features for the particular market segment targeted. However, once a resolution is chosen, along with the active image dimensions and photoreceptor speed, the ROS or optical printhead is designed for the particular data rate which will accommodate those particular parameters. The ROS is then limited to that spot density, in the sense that a significant redesign and development cycle must be undertaken to change the resolution or processor speed.

It would be attractive from a customer satisfaction point of view to develop a printer with multiple resolution capability which would be able to interface with scanners having different resolutions, and to print images of different spot densities, even on the same page or during the same raster.

The prior art includes U.S. Pat. No. 4,733,252. This is a dual-beam acousto-optic modulator (AOM) which can be used to generate dual beams for use in this invention. The concept of multi-resolution, however, is not considered.

U.S. Pat. No. 4,780,732. This is a device which allows fast scan interlacing and possible interlace in the slow scan direction while using an electro-optic total internal reflection (TIR) scanner. However, it requires moving focusing apparatus. Again, no scheme for slow-scan multi-resolution for various spot densities is considered.

U.S. Pat. No. 4,806,951. Basically, this patent describes the interlacing requirements for scanning several beams which are not adjacent, i.e., they are separated by much more than one scan line. Again, no mention is made of multi-resolution.

U.S. Pat. No. 4,847,643 describes very basic polygon ROS design equations. It relies on several separate ROS's prepared as "cartridges" to satisfy resolution requirements.

U.S. Pat. No. 4,905,027. LED bar based patent. This can achieve multiple resolution in the slow scan but not in the fast scan. Additionally, it does not have the advantage of direct data transfer from a X spi generated image into a X spi print unless the LED is specifically an X spi LED. Conversion and interpolation is needed.

U.S. Pat. No. 4,907,017 describes how to obtain a dual-beam diode laser ROS. Does not address multi-resolution concepts.

U.S. Pat. No. 4,926,200. This is the closest in intent to this invention. It uses two LED bars: one at a one resolution and the other at another resolution such that it can print two different resolutions on the same page. It can only get as many resolutions as there are different LED bars.

What is required is a system wherein one ROS can switch between different spot densities.

SUMMARY OF THE INVENTION

A basic concept of this invention is that the most common commercial printer densities, namely, 240, 300, 400 and 600 spi, have a least common denominator of 1200 spots per inch, and that a ROS capable of 1200 lines per inch addressability in the slow scan direction and 600 spi in the fast scan direction can emulate all of these by the appropriate switching of data to the correct rasters.

In the fast scan direction, the spot density can be instantly varied by modulating the beam at a higher frequency. In the slow scan direction, either one or any number of scans can be used to create a single raster. In this case the terms "rasters per inch" and "spots per inch" are synonymous.

A particularly useful embodiment of this invention is based on the use of a multi-channel raster output scanner which generates several individually modulated beams at the same time. If the beams are separated by 1/1200th of an inch, then several adjacent scans can be combined to form one raster. If the beams are separated by a greater distance, then interlacing can be used.

The resultant scanner uses several beams, or channels, for one scan line in order to arrive at a purely electronic means for controlling the cross-scan resolution in a ROS. For example, assume a four channel device. Then a 300 spi scan line could be printed by using all four of these channels in the cross-scan direction (with appropriate magnification in the fast scan direction). Next, the system could print a 400 spi line without changing the polygon rotation speed or photoreceptor speed by modulating the first three channels with the 400 spi data for the first scan line, and modulate the 4th channel to start printing the beginning third of the next scan line. On the next facet scan, the first two channels would complete that scan line, and the last two channels would expose the first two thirds of the next scan line, etc.

Conceptually, it does not matter how many channels there are available in the ROS as long as the least common denominator is a multiple of the number of channels. For example, the invention will work equally well by sweeping a single beam across the output 1200 times per inch, or by sweeping ten channels through the output 120 times per inch. Of course, the larger number of channels will result in a higher printing speed and/or a lower polygon rotation speed.

DESCRIPTION OF THE INVENTION

Figure 1:
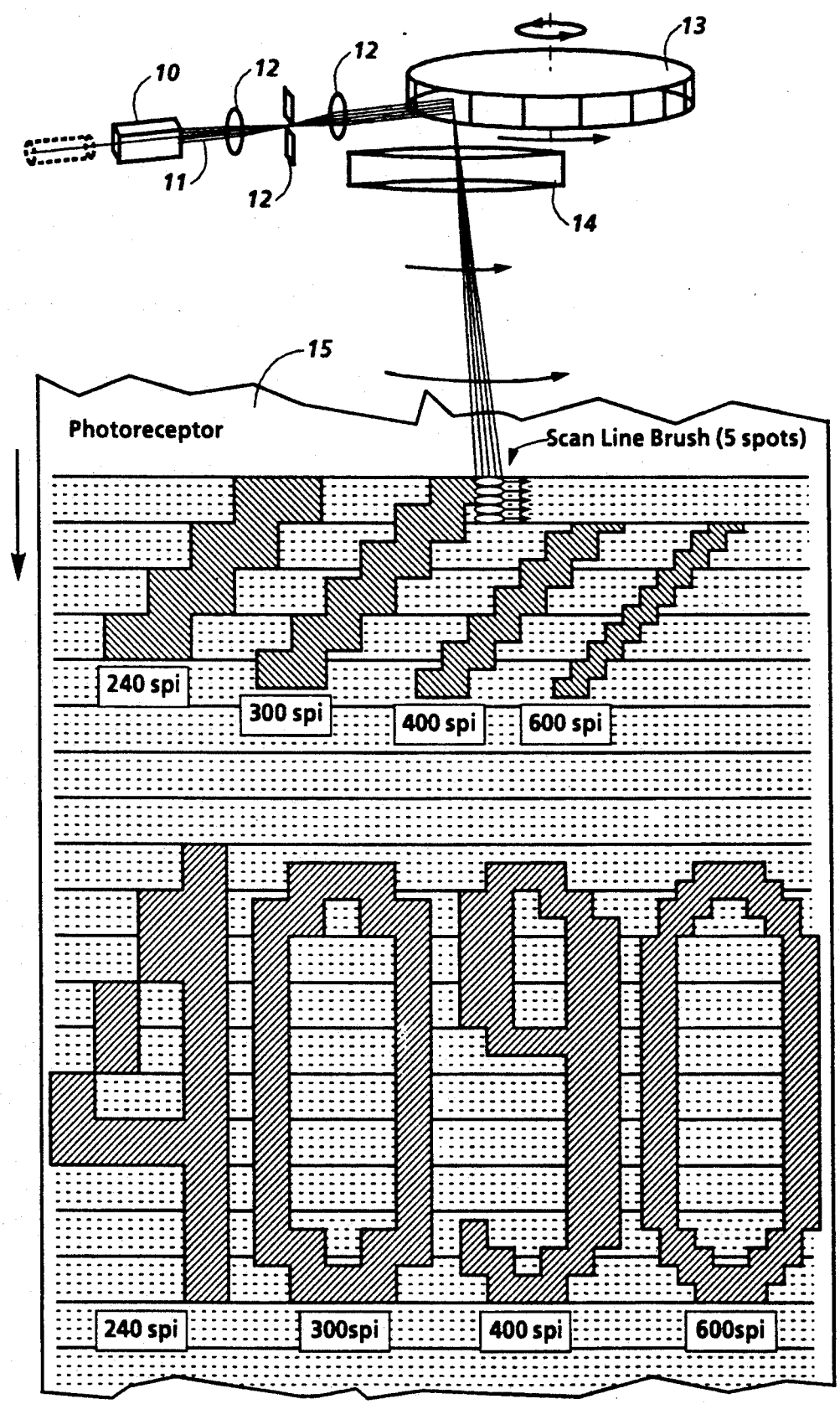
FIG. 1 is an overall view of the system operation.

FIG. 1 shows a multi-channel beam generating device 10 for producing five beams. This device may be a set of laser diodes, an electro-optic total internal reflection (TIR) device for producing multiple beams, a fiber optic array or an acousto-optic device of the type described in U.S. Pat. No. 4,733,252, described above, which is incorporated herein by reference. The resultant beams 11 are focused by the optics onto a polygon 13 which reflects the beams 11 through the scan optics 14 onto the photoreceptor 15.

To generate 240 photoreceptor spi, all five beams are turned on or off at the same time, as shown. Each beam is separated by 1/1200th of an inch from the adjacent beams, so the spot size is 5×1/1200 or 240 spi. To generate 300 photoreceptor spi, four beams are used to generate each spot, as shown. Each beam is separated by 1/1200th of an inch from the adjacent beams, so the spot size is 4×1/1200 or 300 spi. Similarly, sets of three consecutive beams can be used to generate 400 spi and sets of two beams can be used to generate 600 spi.

All of the above dimensions are in the slow scan dimension. In the fast scan direction it is only necessary to vary the ON time of each beam to achieve the desired exposure pixel size. In each of the above illustrated cases, the beam was ON for an amount of time equal to the ON time of two spots.

These various spot sizes can then be used to generate images. Shown are the numbers 4, 0, 9 and 0 displayed as a function of the respective spot sizes and showing the improvement of detail as the number of spots increases.

Figure 2:
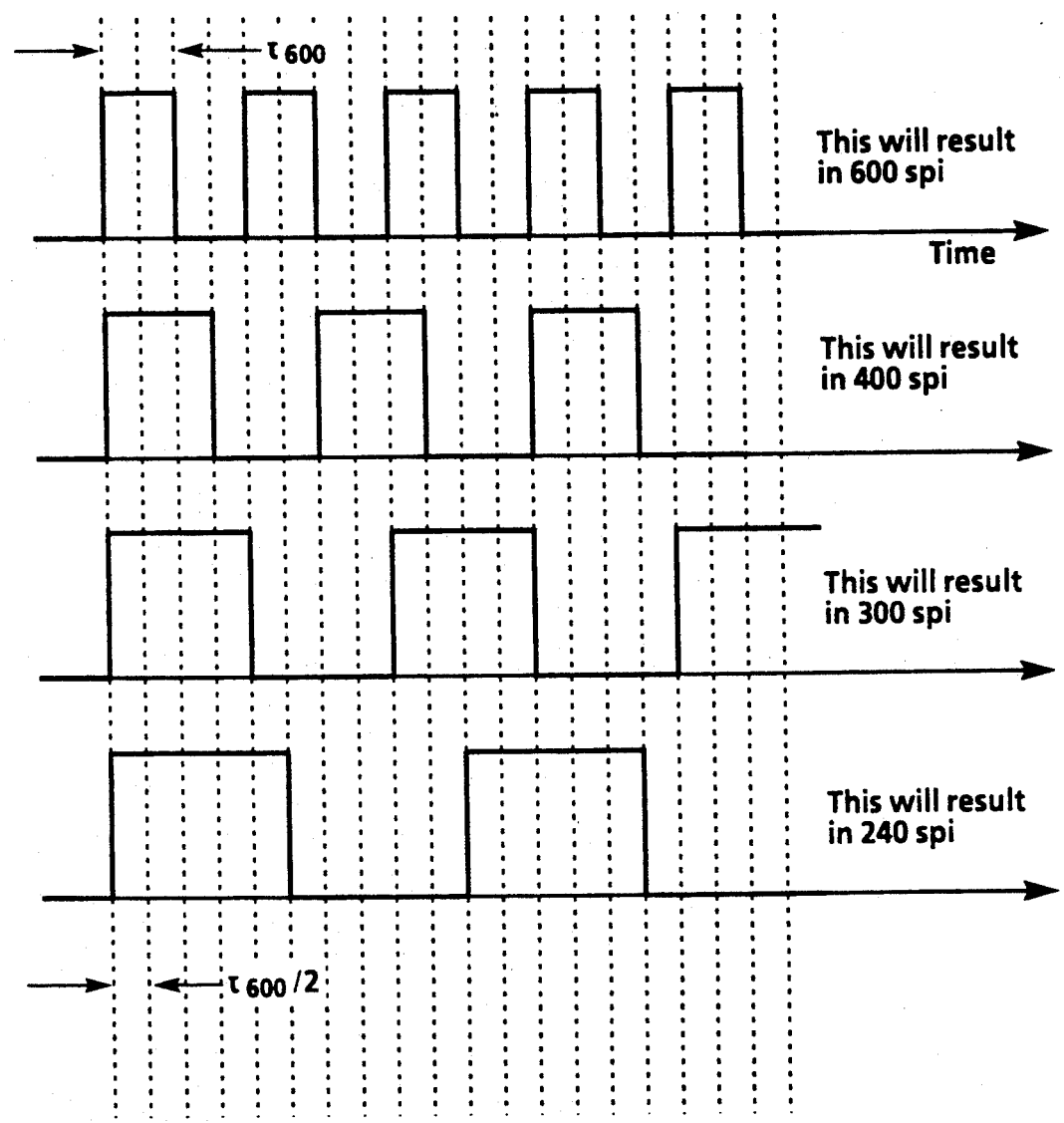
FIG. 2 shows examples of the pulse widths required for various spot densities.

The following is a numerical example of the relationships between the video rates for a 5 channel system. In the cross-scan direction, each facet sweep will scan its 5 channel "brush" 1/240 inch wide, or 105.8 um. Therefore, the only change in video rate will be necessitated by the need to obtain the wanted resolution in the scan direction. The cross-scan resolution is achieved already by the multichannel cross-scan structure discussed. The equation worked out for the video rate is:

Video rate $f_R$ (Mbits/sec)=$L$(in)$V_{P/R}$(in/sec)240 (lpi)$R$(spi), where
  L = Total scan length in inches
  $V_{P/R}$ = Photoreceptor speed
  240 = Overall scan width exposed by one facet scan
  R = Desired resolution The important consideration in these equations is that $f_R$ is proportional to R, and the following ratios apply:
  $f_{600}/f_{240}=5/2$
  $f_{400}/f_{240}=5/3$
  $f_{300}/f_{240}=5/4$
  $f_{240}/f_{240}=5/5$ The denominator n of the 5/n fractions corresponds to the number of channels used to form the cross-scan resolution. The following pixel clock scheme to generate all resolutions can be based on a smallest pulse width with a fixed pulse width increment. Take $T_{600}$ to be the pulse width to achieve 600 spi resolution. To achieve 400 spi resolution requires the addition of $T_{600}/2$ for a total of $3/2T_{600}$. 300 spi resolution requires the addition of another $T_{600}/2$ pulse width for a total of $2T_{600}$, which is twice as long as the 600 spi pulse width. 240 spi requires the addition of another $T_{600}/2$ for a total of $5/2T_{600}$. This is illustrated in FIG. 2 for the case where there is one spot ON and one OFF. The smallest pulse width starts at $T_{600}$, and decreasing resolution uses the concept of addressibility by adding a fixed pulse width to move to the next resolution. In this fashion, the ROS electronics are also considerably simplified.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. A raster output scanner for scanning a photoreceptor with a scanning beam to produce an image, said image having either x or y spots per inch in the slow scan direction, x and y being integers larger than one, said slow scan direction being defined as the direction on the surface of the photoreceptor orthogonal to the direction of the fast scan of the beam across the photoreceptor, comprising:

a beam generating device for simultaneously producing n beams, means for sweeping said n beams across said photoreceptor m times per unit distance in said slow scan direction to produce nm scans per unit distance, x and y being factors of nm, and means for modulating said beams to produce either x or y spots per unit distance in said slow scan direction, each spot encompassing either nm/y or nm/x scan lines.

2. In a raster output scanner for scanning a photoreceptor with a scanning beam to produce an image, the method of producing either x or y spots per inch in the slow scan direction, x and y being integers larger than one, said slow scan direction being defined as the direction on the surface of the photoreceptor orthogonal to the direction of the fast scan of the beam across the photoreceptor, comprising the steps of:

producing n beams, sweeping said n beams across said photoreceptor m times per unit distance in said slow scan direction to produce nm scans per unit distance, x and y being factors of nm, and modulating said beams to produce either x or y spots per unit distance in said slow scan direction, each spot encompassing either nm/y or nm/x scan lines.

* * * * *